Oct. 16, 1951     D. I. BOHN     2,571,822
TEMPERATURE CONTROL SWITCH

Filed April 6, 1948     4 Sheets-Sheet 1

INVENTOR.
DONALD I. BOHN

BY *Ostrolenk & Faber*

ATTORNEYS

Oct. 16, 1951 — D. I. BOHN — 2,571,822
TEMPERATURE CONTROL SWITCH
Filed April 6, 1948 — 4 Sheets-Sheet 4

INVENTOR.
DONALD I. BOHN

Patented Oct. 16, 1951

2,571,822

UNITED STATES PATENT OFFICE 2,571,822

TEMPERATURE CONTROL SWITCH

Donald I. Bohn, Pittsburgh, Pa.

Application April 6, 1948, Serial No. 19,241

5 Claims. (Cl. 200—136.3)

My invention relates to a novel temperature control system, and more particularly to a novel apparatus for a method of modulating a heat supply in accordance with the difference between an indicated desired temperature and the actual temperature, achieved by utiliizng a modified servo principle for temperature control.

In systems heretofore in use, one or more thermal units have been employed which turn on a source of heat when the temperature drops below a predetermined value, the heat supply being kept on until the temperature has been reached. Such systems, however, have been found to be unsatisfactory because of the heat lag which causes the temperature to rise considerably above the desired value after it has been cut off and which permits the temperature to fall to a relatively low value before the heat supply can stop the trend. Temperature fluctuations of as much as 6° result from the present temperature control systems.

In accordance with my invention, the heat supply may be considered as continuously applied cyclically at a predetermined frequency. The cyclical application is, however, variably modulated in accordance with the temperature difference between the indicated desired temperature and the existing temperature, the modulation consisting in cutting the heat supply off or on by variable amounts in accordance with this temperature difference.

Thus, assuming by way of illustration a heat cycle of four minutes, and the room temperature below the desired temperature, in accordance with my invention the temperature control functions to supply continuous heat until the room temperature approaches to within a predetermined value of the desired temperature, which again by way of illustration may be within 2° of the desired temperature. From this point on, the control automatically functions to modulate the four minute cycle; that is, I cut off the heat in each such four minute cycle by a varying amount in accordance with the above mentioned temperature difference, the off time period being smaller when the temperature difference is great and the off period being greater as the temperature difference becomes smaller; or looking at this from a heat supply point of view in each four minute cycle the on period is longer when the above indicated temperature difference is great and the on period is relatively less when the indicated temperature difference is smaller.

At some points in such a modulated system, the heat losses equal the heat supply and a state of equilibrium is achieved in this dynamic system and this condition is maintained so long as this balance maintains. While this state of equilibrium obtains, the on and off time of the heat supply remains constant.

With this application of the servo principle, I have in practice found that I can secure such a state of stability or balance at any point within a range of 2° and I can reduce this temperature range by either decreasing the period of the cycle, i. e., increasing the frequency of the cycle, or by applying auxiliary thermal control to my thermal control mechanism.

Accordingly an object of my invention is to provide a novel cylically operable thermal control.

A further object of my invention is to provide a heat control system having a predetermined on and off period which is modulated in accordance with the difference between a desired and the existing temperature.

Still a further object of my invention is to provide a novel heat control system in which continuous control is secured of the heat supply until a state of equilibrium between heat losses and heat supply is obtained.

Still another object of my invention is to provide a control in which the heat supply is continuous at a predetermined frequency in which the relative on to off period is variably controlled in accordance with predetermined desired temperature conditions.

There are other objects of my invention which together with the foregoing will appear in the detailed description of the drawings in which Figure 1 is a schematic illustration of the complete thermal control and regulator.

Figure 1:
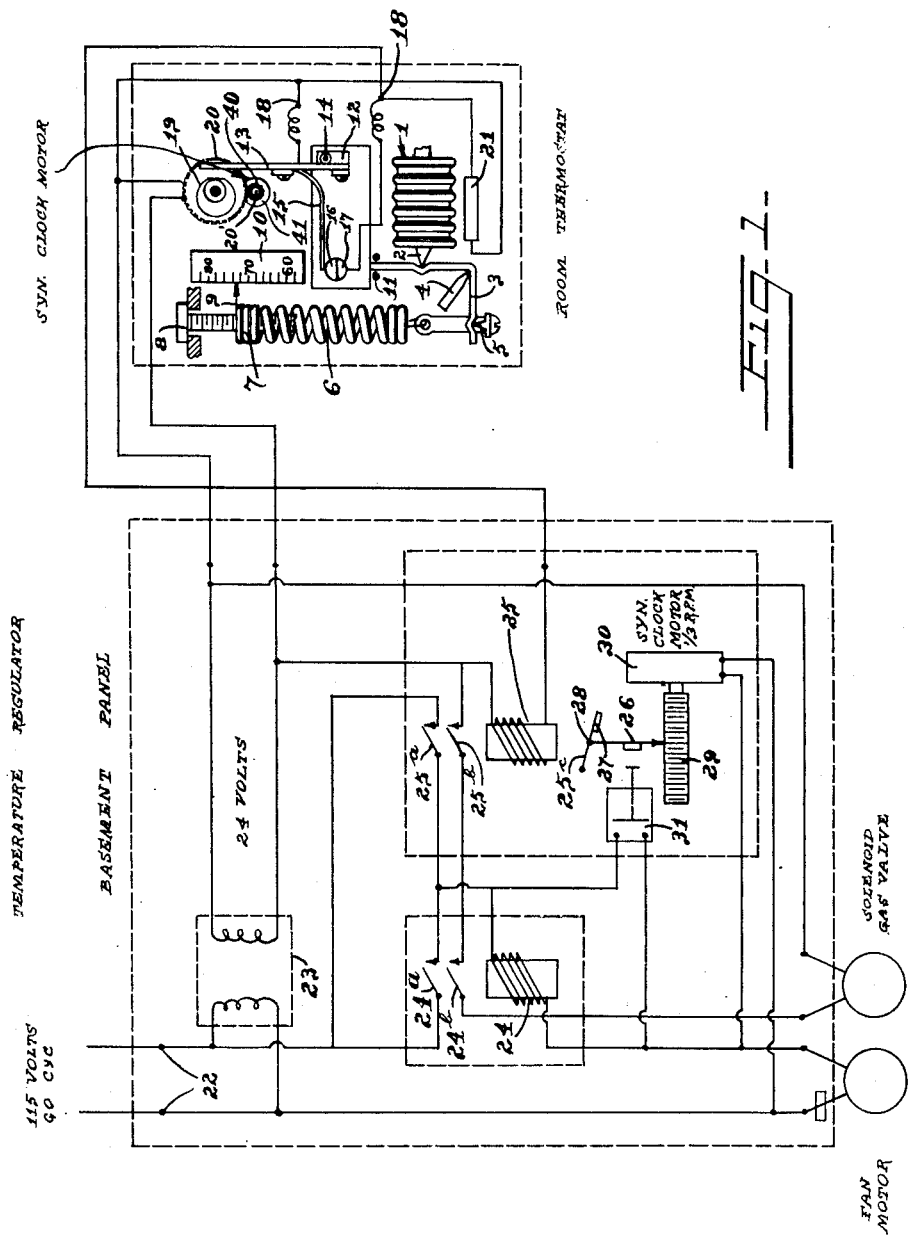

Referring to Figure 1, a vapor filled bellows 1 of well known construction is responsive to the temperature of the space being controlled. A rising temperature causes expansion and a drop in temperature causes a contraction of the bellows. On expansion the bellows exerts a pressure through engaging surface 2 against a lever arm 3 and thus tends to move the lever 3 to the left.

Lever arm 3 is pivotally supported against a fixed pivot 4 about which it oscillates through a small angle. As mentioned, the bellows tends to cause lever arm 3 to rotate counterclockwise about pivot 4. This action, however, is restrained by the upward force of the floating fulcrum 5. Fulcrum 5 is secured to one of the links, the other end of which carries the bottom end of the spring 6, the top end of which is fastened to non-rotatable nut 7 adjustable axially along the screw shown by thumb-screw 8. The vertical position of nut 7 is indicated by pointer 9 adjacent to a temperature calibrated scale 10.

It will be observed that when the bellows has expanded in response to the room temperature, it exerts a force on the lever 3 tending to move it counterclockwise about pivot 4. Simultaneously the tension spring 6 exerts a force tending to rotate the lever 3 clockwise about pivot 4. At some predetermined temperature these forces are in equilibrium and there is no resultant turning torque applied to lever 3.

The design of the parts is such that lever arm 3 rotates about pivot 4 through its entire motion of a small angle with a change in room temperature of about 2° F. This operating motion is limited by stops 11 so that the above mentioned 2° F. of room temperature change will cause lever arm 3 to oscillate at full range between the two stops 11. The actual room temperature at which this motion will occur is adjustable and predetermined by means of thumb-screw 8 which by varying the tension on spring 6 determines the temperature at which a balance of the spring and bellows is secured. This mean temperature value is indicated by pointer 9 against scale 10.

Mounted on and rigidly fixed to lever arm 3 is a small piece of Bakelite sheet 12 which carries a pivoted lever arm 13 operating on pivot pin 14, fastened to Bakelite sheet 12. This lever arm 13 also made of Bakelite carries a contact arm 15 made of a spring material, such as phosphor bronze, and carrying a movable contact 16, as shown. This movable contact 16 will at times, depending upon the difference between the desired temperature indicated at 9 and the actual temperature measured by the bellows 1, engage lower contact 17 which is fastened to Bakelite sheet 12. Connections from both of these contacts to terminals 18 are made with flexible leads.

Mounted adjacent to the upper end of pivoted lever arm 13, in about the position shown, is cam 19 driven by a gear 20 meshing with pinion 40 mounted on a shaft 20' of a small synchronous clock motor 41. Cam 19 is designed as an eccentric with a flattened portion on its minimum radius side, as shown.

The lever arm 13 is pivoted at pin 14 so that when the flattened portion of cam 19 is opposite the lever arm 13, the lever arm 13 has been moved to its extreme counterclockwise position and the contact 16 on the end of the contact arm 15, which is in an extension of lever arm 13, will be moved to engage the fixed contact 17. As the gear 20 is now rotated by its motor, in turn rotating the cam 19, the cammed or enlarged portion of the cam 19 moves to engagement with the arm 13 and rocks the arm 13 about its pivot 11 in a clockwise direction to effect a disengagement between the contacts 16 and 17. The position of the lever 13 when the contacts 16 and 17 are in engagement is shown by the dash lines in Figure 2. The position of the lever 13 when the cam has rotated so that the enlarged portion engages lever 13 is shown by the full line in Figure 2, at which time contacts 16 and 17 are in disengagement.

In one form of the invention, synchronous clock motor 41 operates continuously and rotates cam 19 at a speed of one revolution in four minutes. This speed of rotation is a compromise between selecting a rate of rotation which is much faster to provide more accurate temperature control than is necessary and which would cause an undesirably large number of operations in a day, and too slow a period of rotation which would actually permit an appreciable temperature variation to exist during the period of one rotation. This speed of cam rotation, therefore, may be selected to suit various conditions. It has been found by trial that one revolution in four minutes is quite satisfactory for a normal house, both from a standpoint of providing perfect control and yet not causing an excessively high number of gas valve operations in a certain period of time.

Before following through the entire circuit system, it is first necessary to have a comprehension of the operation of this thermostat without regard to the rest of the circuit, except to mention that when movable contact 16 touches lower contact 17, the gas is turned on in the furnace.

Assume that the room temperature is at 60° F. and that the adjustment of thumb-screw 8 is set at 70° F. so that when a room temperature of 70° F. is reached, the opposing forces of spring 6 and bellows 1 on lever 3 balance and the lever will float midway between stops 11.

With the room temperature at 60° F., lever arm 3 will be in its extreme clockwise position and the relationship of the various parts when in this position is such that movable contact 16 touches lower contact 17 all of the time, as under this condition the upper end of pivoted lever arm 13 will be far enough to the right of cam 19 so that cam 19 does not touch the upper end of pivoted lever arm 13 at any point of its entire revolution.

Figure 2:
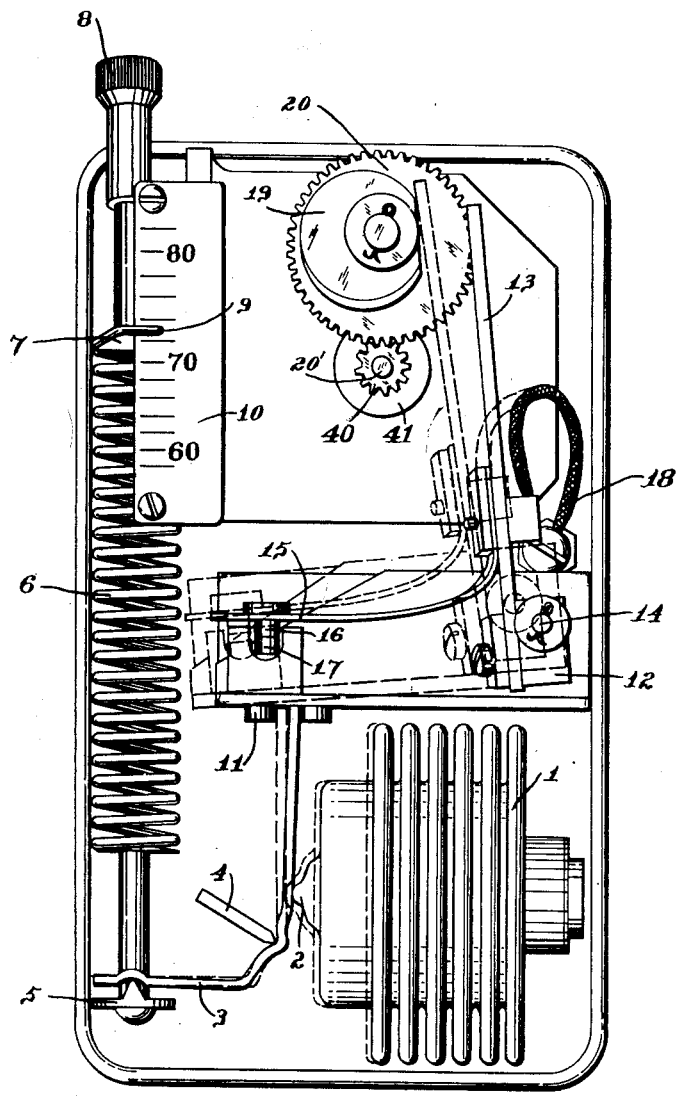
Figure 2 shows the details of the thermal control showing continuous heat application when the room temperature is more than a predetermined value below the desired temperature.
Figure 3:
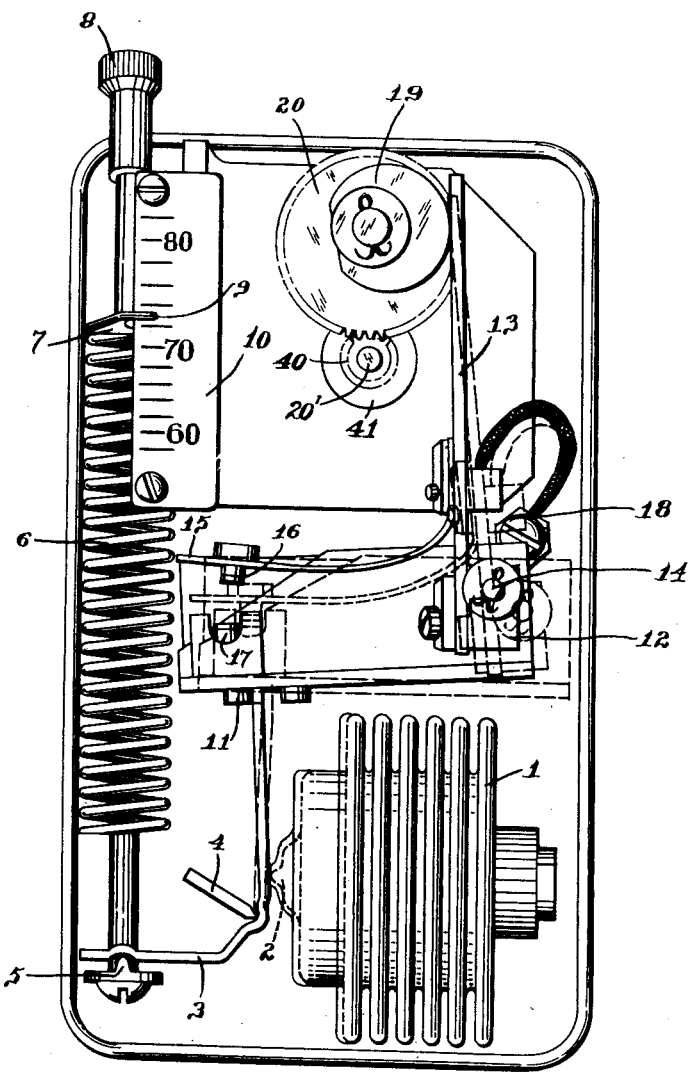
Figure 3 shows the same thermal control functioning to modulate the heat supply when the room temperature is near the desired value.

This condition is illustrated in full line in Figure 2 and the dotted line in Figure 3. As will be clear from the dashed position of Figure 3, the member 12 is in its extreme right position due to the contraction of the bellows and accordingly with cam 19 towards lever 13, it will still not engage the lever. Accordingly the contacts 15 and 16 remain engaged as shown in the dotted position. In Figure 2 member 12 and lever 13 are shown in full with the member 12 still in its extreme right position and of course the contacts remain closed.

The gas is now turned on continuously, regardless of the operation of cam 19, until the room temperature reaches and slightly exceeds 69° F. When this temperature condition is reached, Bakelite member 12 is moved to the left by the bellows, and lever arm 3 will leave the right-hand stop 11. The movement of member 12 to the left will bring the upper end of pivoted lever arm 13 closer to cam 19.

A very slight movement in this direction is sufficient so that the long radius portion of cam 19 will touch the upper part of pivoted lever arm 13 for a short period of time each revolution, forcing it to rotate clockwise through a small angle about pivot pin 14 and causing movable contact 16 to separate from lower contact 17.

This condition is shown in the dotted lines of Figure 2 and the full lines of Figure 3. In Figure 2 with the cam 19 as shown, lever 13 has followed the cam and the contacts are closed. In Figure 3 with the cam rotated 180°, lever 13 has been rocked about its pivot to disengage contact 16 from contact 17.

Thus it will now be evident that Figure 2 shows the condition which obtains when the large radius of the cam is away from lever 13 both for conditions when the room temperature is below the desired value shown in the full lines with the parts in their extreme right position, and when the room temperature is near normal shown in dotted lines with the parts moved to the left.

Figure 3 shows the conditions which obtain when the large radius of the cam is toward lever 13 both for conditions when the room temperature is below the desired value shown in the dotted lines with the parts in their extreme right position, and when the room temperature is near normal shown in the full lines with the parts moved to the right.

It will be observed from the above that until the room reaches 69° F., the gas is on all of the time; that is, it is on for 240 seconds of the 240 seconds representing one revolution of cam 19.

As soon as the temperature slightly exceeds 69° F., the above mentioned action cuts off the gas for a few seconds during each cam revolution, and this period of cut-off is gradually increased as lever arm 3 is turned through a small counterclockwise angle about pivot 4 in response to the action of bellows 1 and the rising room temperature.

Consideration of this entire operation will show that at some position of lever arm 3 the seconds per four minute cycle during which the gas is turned on will just provide sufficient heat to balance the heat losses and is maintained at this temperature. At this point of equilibrium, the lever arm 3 will stop its counterclockwise motion.

For example, if the weather conditions are such that a temperature of 70° F. will result with the gas on 120 seconds out of every 240 seconds, then this equilibrium will be reached with the room temperature at 70° F. and lever arm 3 in its midposition, this position providing such 120 second gas operation per 240 second cycle.

It may also be that the weather conditions caused a rate of rise such that the temperature is stabilized at 70.5° F. with the gas on sixty seconds out of a 240 second cycle, in which case this will be the point at which equilibrium will be established.

From this description it will be seen that equilibrium will always be established within the 2° F. range representing the "regulation" of the device. Hereafter additional detail will be discussed for reducing this range.

Figure 4:
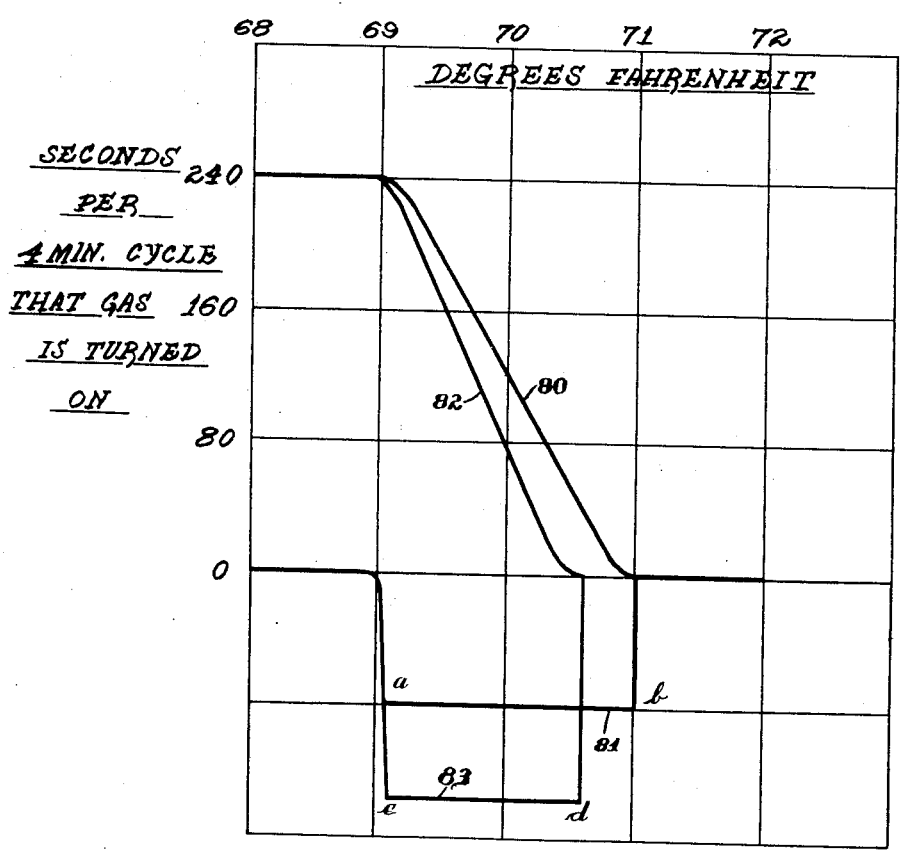
Figure 4 shows a set of curves illustrating the principle on which the device operates.

Referring now to Figure 4, I have here shown a curve in which the time of heat application per four minute cycle is plotted against temperature. It will be noted that for a setting of 70° F., curve 80 is substantially a straight line from 69° to 71° indicating a linear characteristic. Curve 81 which is the first derivative of curve 80 showing the slope of the curve, illustrates the now obvious fact that a state of equilibrium is achievable between $a$ and $b$ at any temperature between 69° and 71° for this particular setting.

Curve 82 shows the curve obtained when the control has been made more sensitive. Here a straight line curve is obtained between 69° and 70.5°, the equilibrium as shown by the first derivative curve 83 being between $c$ and $d$.

Referring again to Figure 1, the left-hand assembly on this figure indicates a control panel mounted in the basement, entitled "Basement Panel." At the top of this panel, terminals 22 receive the main power source assumed to be 115 volts, 60 cycles, single phase. Connected across these loads is the primary of a small transformer 23 which provides a 24 volt output for certain parts of the scheme on which it would be undesirable to impose 115 volts.

This panel contains two relays, one a series relay 24 and the other shunt relay 25. Series relay 24 is provided with a coil which will close its relay contacts when normal current as required by the 115 volt fan motor is flowing. Shunt relay 25 will close its contacts when 24 volts, 60 cycles, is applied to its coil.

Assume that the equipment is just being placed in operation and that contacts 16 and 17 of the room thermostat are not touching. It will be observed that the coil of relay 25 will be de-energized and therefore its contacts will be open. Similarly, relay 24 will be de-energized since there is no fan current passing through its series coil.

As soon as thermostat contacts 16 and 17 engage, as described previously, relay 25 will be energized, and both of its contacts will be closed. Contact 25a of relay 25 will therefore provide a path for current to the fan through the series coil of relay 24. This will initially start and run the fan motor and will also energize relay 24 because the motor current will be flowing through the series coil of relay 24.

As soon as relay 24 has closed, which occurs instantly after the closing of contact 25a, its contact 24a, which is in parallel with the contact 25a of relay 25, will provide a parallel path for fan motor current, thus sealing in relay 24.

So far the operation of relay 25 has been described with reference to its function of starting the fan motor. Closing of contact 25b of relay 25 and contact 24b of relay 24 will complete an energizing circuit for the solenoid gas valve which will be energized and the gas will be turned on in the furnace.

The gas will remain turned on until in accordance with the previous description of room thermostat operations contacts 16 and 17 separate. Therafter relay 25 will be de-energized opening both of its contacts. This will shut off the gas to the furnace, but it should be observed that relay 24 will still remain closed and the fan motor will continue to operate.

At this point it should be explained that the basic principle of this entire scheme demands that the circulating fan operate continuous unless the temperature outside rises to such a point that no heat is required from the furnace; and after this condition has existed for a short period of time, such as thirty or forty minutes, the fan should be automatically shut down, as there is no need for its continued operation.

This feature is taken car of by a pivoted arm 26 pivoted at 28 and carrying a small counterweight 27, which is fastened rigidly to the armature 25c of relay 25. When relay 25 is energized, arm 26 is raised away from engagement with threaded shaft 29. When relay 25 is de-energized, however, arm 26 rests against the thread of threaded shaft 29 as shown. Threaded shaft 29 is rotated slowly (in this case at ⅓ R. P. M.) by means of a small synchronous clock motor 30 which is connected electrically, as shown, to operate only when the fan motor is operating.

It will be seen that this arrangement of devices is such that during the de-energized period of relay 25, arm 26 which contacts the thread of threaded shaft 29 is caused to move to the left by virtue of the rotation of threaded shaft 29, and of course it will progress one thread every three minutes.

If the room thermostat has not called for any heat for a long period of time, such as thirty or forty minutes, arm 26 will have progressed far enough to the left on threaded shaft 29 so that it will contact micro-switch 31 and close its contacts. These contacts are in parallel with the series coil of relay 24 so that the closing of micro-switch 31 will cause relay 24 to de-energize, thus shutting down the fan motor and incidentally stopping the rotation of threaded shaft 29.

This condition will now exist until, due to a drop in outside temperature or a manual readjustment of the room thermostat, heat is again called for by contacts 16 and 17 being caused to touch. When this happens, relay 25 is energized, the fan motor is started, gas is turned on, arm 26 is lifted from contact with threaded shaft 29, micro-switch 31 is opened, and normal operating conditions obtain.

This control scheme provided by the basement panel, therefore, takes care of the following functions:

1. If the fan has not been operating, it will be caused to start at the first demand for heat from the room thermostat.
2. The fan will continue to operate for a period of thirty to forty minutes if during this period no heat is called for by the room thermostat.
3. At the expiration of this period, the fan will be caused to shut down and will remain down until heat is again called for.
4. A safety feature is provided in that the gas cannot be turned on unless the fan is in operation, series relay 24 insuring this.

As pointed out hereinbefore, the thermostat has a "regulation" of about 2° F. This means that if it were adjusted at the figure above mentioned, 70° F., it would hold the exact temperature of 70° F. only when the temperature outside was such that a heat balance was established with the gas on half the time, or 120 seconds out of every 240 second cycle.

If with the thermostat so adjusted the outside temperature should rise to, let us say 68° F., then heat balance will be established with lever arm 3 in nearly its left-hand position. Because of this 2° F. regulation, the temperature in the house will be held at about 71° F. as equilibrium is established at this figure. Conversely, if with the same thermostat setting, the outside temperature is very low and substantially full time gas operation is required, then equilibrium will be established with lever arm 3 at about its maximum clockwise position necessary to provide full or nearly full time gas operation. This position of equilibrium will be established at about 69° F.

From the above it will now be clear that in accordance with the disclosed novel temperature control, substantially no fluctuation in room temperature is possible. Once the point of equilibrium has been reached at which the losses equal the heat supply, the percentage on period of the heat will maintain that precise temperature condition except for what infinitesimal variation may occur within the four minute cycle period between the on period of the heat and the off period of the heat.

As the outside temperature changes slightly or for any other reason, the rate of heat loss varies and the control here shown will respond instantaneously to change the percentage time of the heat supply in each cycle to relate the new heat supply to the new heat loss.

It will be observed that a maximum variation of 2° F. cannot exist over a short time period, such as a day or so, so that this 2° F. differential is actually of no great moment as the thermostat is probably manually adjusted many times between a very mild weather period and an extremely cold weather period.

While this condition, therefore, would not make worth while any very expensive or complicated corrective scheme to eliminate it, I have proposed a construction which with a negligible cost and substantially no complications reduces the temperature range.

Resistor 21 is of such a value that if 24 volts were applied to it continuously, its heat acting on bellows 1 to which it is adjacent would cause an expansion of the bellows equivalent to, let us say, 1.5° F. adjustment of thumb-screw 8. Of course, if it were connected in this manner it would be of no help merely providing a fixed change in calibration of the thermostat.

In order to largely correct for this 2° F. regulation above mentioned, this resistor 21 is connected to contacts 16 and 17. It should be mentioned that the wattage required in resistor 21 is so small and its resistance therefore so high that when contacts 16 and 17 are not touching and it is operating in series with the coil of relay 25, it receives substantially full voltage. Conversely, the current which resistor 21 permits to flow through the coil of relay 25 when contacts 16 and 17 are open is only a very small percentage of the current required to close relay 25. Its connection in the manner shown, therefore, does not in the slightest degree affect the operation of relay 25 as described previously.

With this connection it will be observed that resistor 21 is energized during the period that the gas is not turned on the furnace. It should also be mentioned that the intermittent applications of voltage to resistor 21 will provide a substantially steady biasing heat to affect bellows 1 due to the thermal storage involved in the various elements. Due to this thermal storage the heater effect is that based on the average input over a long period of time. It therefore functions at a corrective device which provides an artificial ambient on the thermostat based on the general percent "off" operation of the thermostat.

If, as previously assumed, the value of resistor 21 is selected so that with voltage applied to it continuously the calibration of the thermostat would be affected 1.5° F., then the actual connection employed to provide intermittent energy to resistor 21 will reduce the 2° F. regulation inherent in the mechanics of the scheme to the difference between these two figures, or .5° F.

By slightly lowering the resistance of resistor 21 further, this regulation could be theoretically reduced to 0° F. and it may work perfectly under this condition, but there is a chance that hunting and overshooting will result if this is done. In any event, resistor 21 as described provides a simple and inexpensive scheme to substantially eliminate the 2° F. regulation and this may be considered a minor advantage.

In a modified form, I may reduce the cycle time to three minute, two minute, or even shorter periods for the rotation of the cam 19. Reduction of the cycle time increases the rapidity of corrective effort required by changing temperature conditions and accordingly would decrease the fractional degree variations occurring during a cycle.

In the above I have described my invention applied to a hot air circulating system. It will be obvious, however, that it is equally applicable to other forms of heat, such as hot water systems.

In the latter it is presently the practice to maintain water around the furnace jacket at a predetermined temperature by hydrostatic control. A water pump operating in response to a temperature responsive element in the room whose temperature is to be controlled, circulates the water from the jacket when there is a demand for heat. As pointed out above, such a system with its inherent heat lag, creates a wide fluctuation in temperature.

It has the further disadvantage in many systems in which domestic heat for the water to be consumed is supplied by coils in the water jacket that when there is a radiator heat demand, the water jacket temperature drops rapidly, thus momentarily removing the domestic hot water supply.

In accordance with my invention, I avoid these disadvantages by intermittently operating the pump circulator to send the hot water to the radiators intermittently under the thermal control described above. Alternatively, I may do away with the hydrostatic control and instead apply intermittent heat to the water jacket of the furnace in accordance with my novel control.

While I have shown the heat supply as being turned on and off, it will also be apparent that I may modulate the heat supply by varying the degree of gas valve opening between an upper and lower limit under operation of my control device. The basic concept of my invention may take many forms and I do not want to be limited except as set forth in the appended claims.

I claim:

1. In a temperature control device for controlling the supply of heat to a room, a vapor-filled bellow type temperature control device, a lever, a fixed pivotal support for said lever, said bellows engaging said lever for rocking it about said pivotal support in accordance with the expansion of said bellows in response to temperature rise in the room being controlled, a spring biased floating fulcrum for said lever for biasing said lever against the action of said bellows, an adjusting member for adjusting the bias of said spring, a temperature calibrated scale adjacent said adjusting member, said adjusting member indicating on said scale the adjustment of said spring bias, a pair of stops on opposite sides of said lever for limiting the angle of movement of said lever to a movement corresponding to a two degree temperature response of said temperature control device, a member rigidly secured to and movable with said lever and carrying a first movable contact, an arm carried by said member and having a second movable contact secured thereto for engaging and disengaging said first movable contact, a cam having a surface engaged by said arm, a synchronous clock motor connected to and driving said cam, the connection from said motor to said cam being constructed to drive said cam at a speed of one-quarter R. P. M., said cam during one portion of its rotation being in engagement with said arm and moving said second movable contact toward disengagement with said first contact and said first contact being moved toward disengagement with said second contact by expansion of said temperature responsive device in accordance with the setting of said biasing spring to effect engagement between said contacts for variable periods of time during each complete revolution of said cam.

2. In a temperature control device for controlling the supply of heat to a room, a temperature responsive device, a lever, a fixed pivotal support for said lever, said temperature responsive device engaging said lever for rocking it about said pivotal support in accordance with the operation of said temperature responsive device in response to temperature rise in the room being controlled, a spring biased floating fulcrum for said lever for biasing said lever against the action of said temperature responsive device, an adjusting member for adjusting the bias of said spring, a temperature calibrated scale adjacent said adjusting member, said adjusting member indicating on said scale the adjustment of said spring bias, a pair of stops on opposite sides of said lever for limiting the angle of movement of said lever to a movement corresponding to the temperature range within which the room is to be maintained, a member rigidly secured to and movable with said lever and carrying a first movable contact, an arm carried by said member and having a second movable contact secured thereto for engaging and disengaging said first movable contact, a cam having a surface engaged by said arm, a motor connected to and driving said cam, the connection from said motor to said cam being constructed to drive said cam at a speed of one-quarter R. P. M., said cam during one portion of its rotation being in engagement with said arm and moving said second movable contact toward disengagement with said first contact and said first contact being moved toward disengagement with said second contact by said temperature responsive device in response to temperature rise in accordance with the setting of said biasing spring to effect engagement between said contacts for variable periods of time during each complete revolution of said cam.

3. In a temperature control device for controlling the supply of heat to a room, a temperature responsive device, a lever, a pivotal support for said lever, said temperature responsive device engaging said lever for rocking it about said pivotal support in accordance with the expansion of said temperature responsive device in response to temperature rise in the room being controlled, a spring for biasing said lever against the action of said temperature responsive device, an adjusting member for adjusting the bias of said spring, a temperature calibrated scale adjacent said adjusting member, said adjusting member indicating on said scale the adjustment of said spring bias, a member rigidly secured to and movable with said lever and carrying a first movable contact, an arm carried by said member and having a second movable contact secured thereto for engaging and disengaging said first movable contact, a cam having a surface engaged by said arm, a motor connected to and driving said cam, the connection from said motor to said cam being constructed to drive said cam at a speed of the order of one-quarter R. P. M., said cam during one portion of its rotation being in engagement with said arm and moving said second movable contact toward disengagement with said first contact and said first contact being moved toward disengagement with said second contact by expansion of said temperature responsive device in accordance with the setting of said biasing spring to effect engagement between said contacts for variable periods of time during each complete revolution of said cam.

4. In a temperature control device for controlling the supply of heat to a room, a temperature responsive device, a lever, a pivotal support for said lever, said temperature responsive device engaging said lever for rocking it about said pivotal support in accordance with the expansion of said temperature responsive device in response to temperature rise in the room being controlled, a spring for biasing said lever against the action of said bellows, a member rigidly secured to and movable with said lever and carrying a first movable contact, an arm carried by said member and having a second movable contact secured thereto for engaging and disengaging said first movable contact, a cam having a surface engaged by said arm, a motor connected to and driving said cam, the connection from said motor to said cam being constructed to drive said cam at a speed of the order of one-quarter R. P. M., said cam during one portion of its rotation being in engagement with said arm and moving said second movable contact toward disengagement with said first contact and said first contact being moved toward disengagement with said second contact by expansion of said temperature responsive device in accordance with the setting of said biasing spring to effect engagement between said contacts for variable periods of time during each complete revolution of said cam.

5. In a temperature control device for controlling the supply of heat to a room, a temperature responsive device, a lever, a fixed pivotal support for said lever, said temperature responsive device engaging said lever for rocking it about said pivotal support in accordance with the expansion of said temperature responsive device in response to temperature rise in the room being controlled, a spring for biasing said lever against the action of said temperature responsive device, an adjusting member for adjusting the bias of said spring, a temperature calibrated scale adjacent said adjusting member said adjusting member indicating on said scale the adjustment of said spring bias, stop members for limiting the angle of movement of said lever to a movement corresponding to a two degree temperature response of said temperature control device, a member rigidly secured to and movable with said lever and carrying a first movable contact, an arm carried by said member and having a second movable contact secured thereto for engaging and disengaging said first movable contact, a cam having a surface engaged by said arm, a motor connected to and driving said cam, the connection from said motor to said cam being constructed to drive said cam at a speed of one-quarter R. P. M., said cam during one portion of its rotation being in engagement with said arm and moving said second movable contact toward disengagement with said first contact and said first contact being moved toward disengagement with said second contact by expansion of said temperature responsive device in accordance with the setting of said biasing spring to effect engagement between said contacts for variable periods of time during each complete revolution of said cam.

DONALD I. BOHN.

REFERENCES CITED

The following references are of record in the file of this patent:

UNITED STATES PATENTS

| Number | Name | Date |
| --- | --- | --- |
| 2,185,759 | Young | Jan. 2, 1940 |
| 2,214,912 | Valjean | Sept. 17, 1940 |
| 2,251,483 | Denison et al. | Aug. 5, 1941 |
| 2,258,457 | Kimball | Oct. 7, 1941 |
| 2,271,651 | Kucera | Feb. 3, 1942 |
| 2,298,323 | Wheeler | Oct. 13, 1942 |
| 2,487,948 | Senn | Nov. 15, 1949 |
| 2,488,572 | Varney | Nov. 22, 1949 |